US008439367B2

(12) United States Patent
Jeanne et al.

(10) Patent No.: US 8,439,367 B2
(45) Date of Patent: May 14, 2013

(54) MOLDED DEFORMABLE SHAPE GASKET FOR MOLDING LARGE GASKETS IN A DEFORMED SHAPE

(75) Inventors: Olivier Jeanne, Saint Junien (FR); Romain Faure, Couzeix (FR); Paul F. Hailey, Bedford, NH (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 119 days.

(21) Appl. No.: 13/221,232

(22) Filed: Aug. 30, 2011

(65) Prior Publication Data

US 2013/0049307 A1  Feb. 28, 2013

(51) Int. Cl.
*F02F 11/00* (2006.01)
(52) U.S. Cl.
USPC .......................................... 277/598; 277/924
(58) Field of Classification Search .................. 277/598, 277/616, 632, 637, 650, 924, 925
See application file for complete search history.

(56) References Cited

U.S. PATENT DOCUMENTS

| 3,438,117 A | 4/1969 | Engleman |
| 3,485,908 A | 12/1969 | Burger |
| 3,738,670 A | 6/1973 | Jelinek et al. |
| 4,293,135 A | 10/1981 | Wallace |
| 4,690,413 A | 9/1987 | Adkins |
| 5,161,808 A | 11/1992 | Walters |
| 5,618,047 A * | 4/1997 | Belter ............................ 277/632 |
| 5,647,255 A | 7/1997 | Stone |
| 5,934,681 A | 8/1999 | Novak et al. |
| 6,536,775 B1 * | 3/2003 | Inciong ........................... 277/596 |
| 2010/0253012 A1 * | 10/2010 | Zhuang et al. ................. 277/637 |

FOREIGN PATENT DOCUMENTS

JP          56024260 A  *  3/1981

* cited by examiner

*Primary Examiner* — Vishal Patel
*Assistant Examiner* — Stacy Warren
(74) *Attorney, Agent, or Firm* — Daniel J. Sepanik, Esq.; Harness, Dickey & Pierce, P.L.C.

(57) ABSTRACT

A gasket is provided including a plurality of corner sections each having a cross-section having a width of at least a first dimension. A plurality of deformable sections are disposed between a pair of the plurality of corner sections, each of the plurality of deformable sections have a plurality of reduced width segments. The plurality of deformable sections have a curved shaped that is deformable to a straight shape in its installed condition, wherein the deformable sections allow the gasket to be formed with a smaller molding footprint than the assembled gasket shape and the plurality of corner sections have a same angled orientation in its installed and uninstalled molded positions.

14 Claims, 7 Drawing Sheets

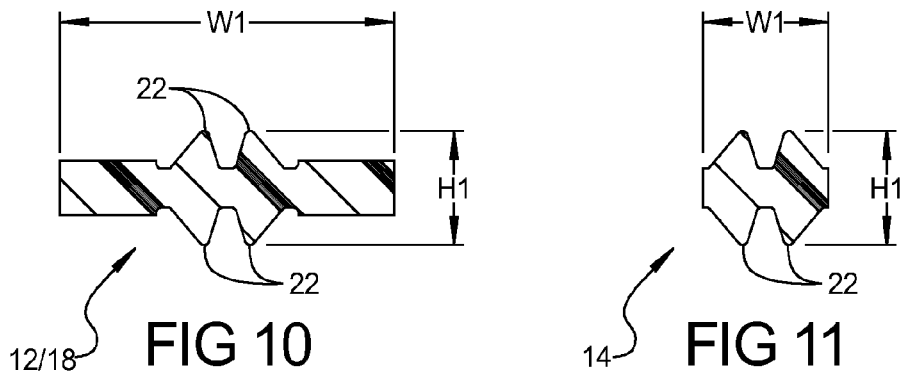
FIG 10
FIG 11
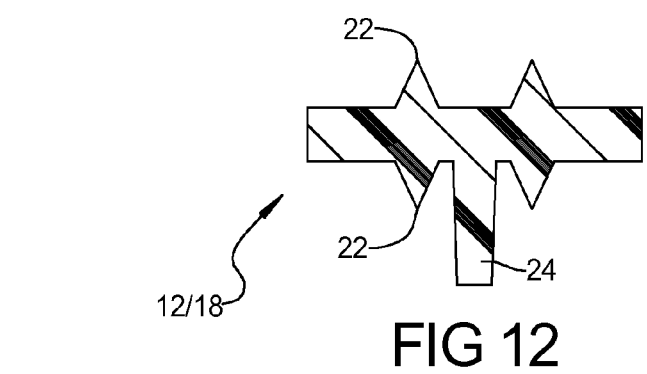
FIG 12
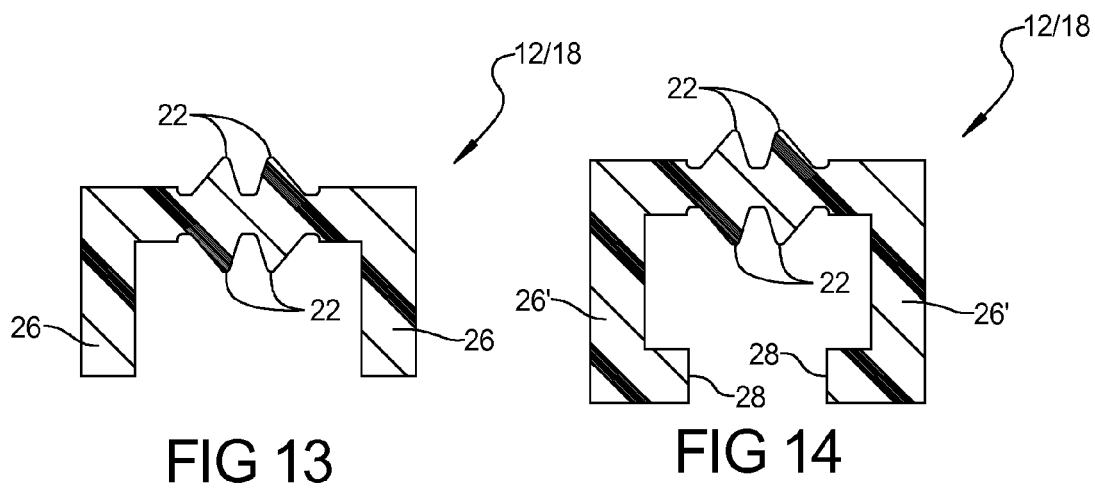
FIG 13
FIG 14

MOLDED DEFORMABLE SHAPE GASKET FOR MOLDING LARGE GASKETS IN A DEFORMED SHAPE

FIELD

The present disclosure relates to a gasket design for molding large gaskets in a deformed shape.

BACKGROUND

This section provides background information related to the present disclosure which is not necessarily prior art.

Typically, gaskets used for sealing battery covers in electric or hybrid electric vehicles have been very large die cut foam type gaskets. In order to get the required curved power from the electric batteries, these battery cases and covers are very large. In some cases much greater than one meter square and in some cases one meter by two meter. If the gasket were to be molded using a platen size equal to the gasket, the capital cost for the press would be very high and unfortunately the use of the press would be fairly limited to these battery gaskets. Accordingly, the present disclosure provides a gasket design that creates the opportunity to reduce the molding footprint of the part and can reduce the capital requirement to mold these large gaskets.

SUMMARY

This section provides a general summary of the disclosure, and is not a comprehensive disclosure of its full scope or all of its features.

According to a first embodiment of the present disclosure, a gasket is provided including a plurality of corner sections and a plurality of deformable sections disposed between a pair of the plurality of corner sections. The deformable sections include an arcuate body having an undulating bridge portion attached to the arcuate body at a plurality of spaced locations. The plurality of deformable sections each have a curved shape that is deformable to a straight shape in its installed condition, wherein the deformable sections allow the gasket to be formed with a smaller molding footprint than the assembled gasket shape and the plurality of corner sections have a same angled orientation in its installed and un-installed positions.

According to a second embodiment of the present disclosure, a gasket is provided including a plurality of corner sections each having a cross-section having a width of at least a first dimension. A plurality of deformable sections are disposed between a pair of the plurality of corner sections, each of the plurality of deformable sections have a plurality of reduced width segments spaced between a plurality of increased width segments. The increased width segments have a cross-section having a width of at least the first dimension and the plurality of reduced width segments having a cross-section having a width less than the first dimension. The plurality of deformable sections have a curved shaped that is deformable to a straight shape in its installed condition, wherein the deformable sections allow the gasket to be formed with a smaller molding footprint than the assembled gasket shape and the plurality of corner sections have a same angled orientation in its installed and un-installed molded positions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 10 is a cross-sectional view of the corner segments of the gasket shown in FIG. 1;

FIG. 11 is a cross-sectional view of the reduced width segments of the deformable sections of the gasket shown in FIG. 1;

FIG. 12 is a cross-sectional view of the gasket showing an indexing post according to the principles of the present disclosure;

FIG. 13 is a cross-sectional view of an alternative configuration of the undeformed corner sections and increased width segments of the deformable sections of the gasket according to the principles of the present disclosure; and FIG. 14 is a cross-sectional view of a further alternative configuration of the undeformed sections of the gasket according to the principles of the present disclosure.

Corresponding reference numerals indicate corresponding parts throughout the several views of the drawings.

DETAILED DESCRIPTION

Figure 1:
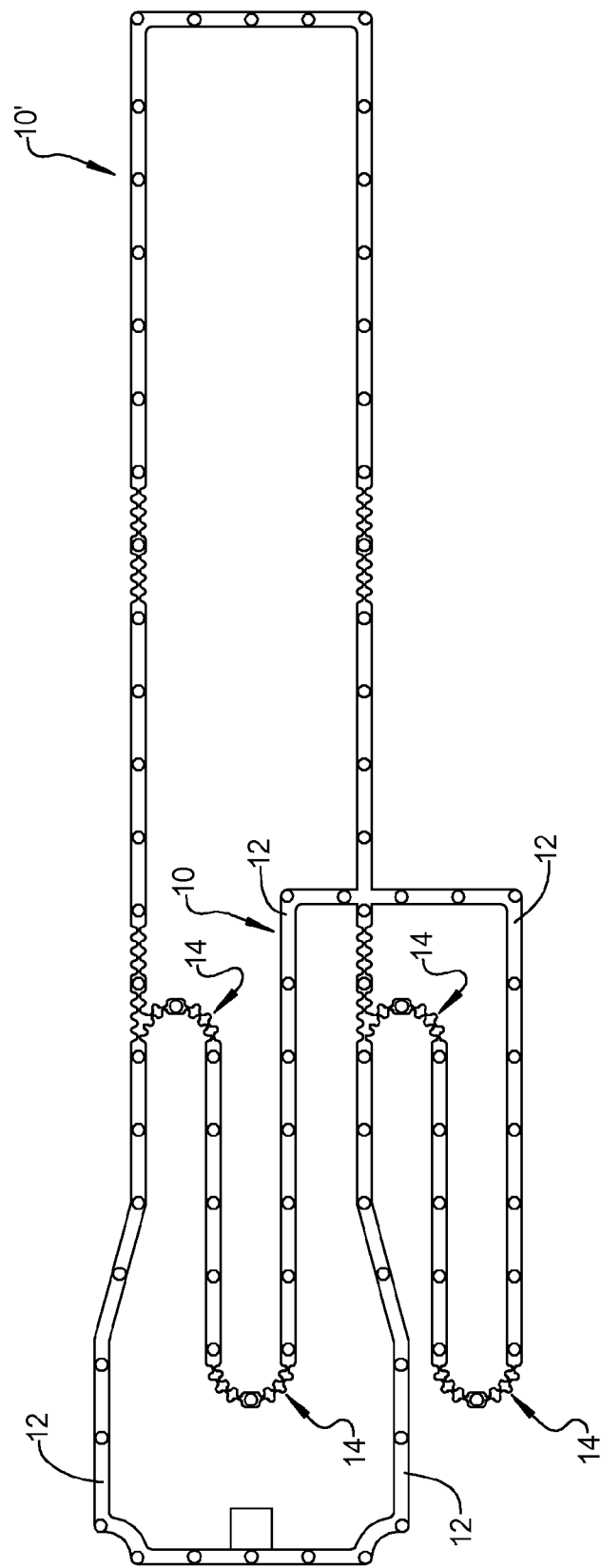
FIG. 1 is a top plan view of a large gasket formed in a deformed shape and also illustrating the gasket in its assembled condition according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
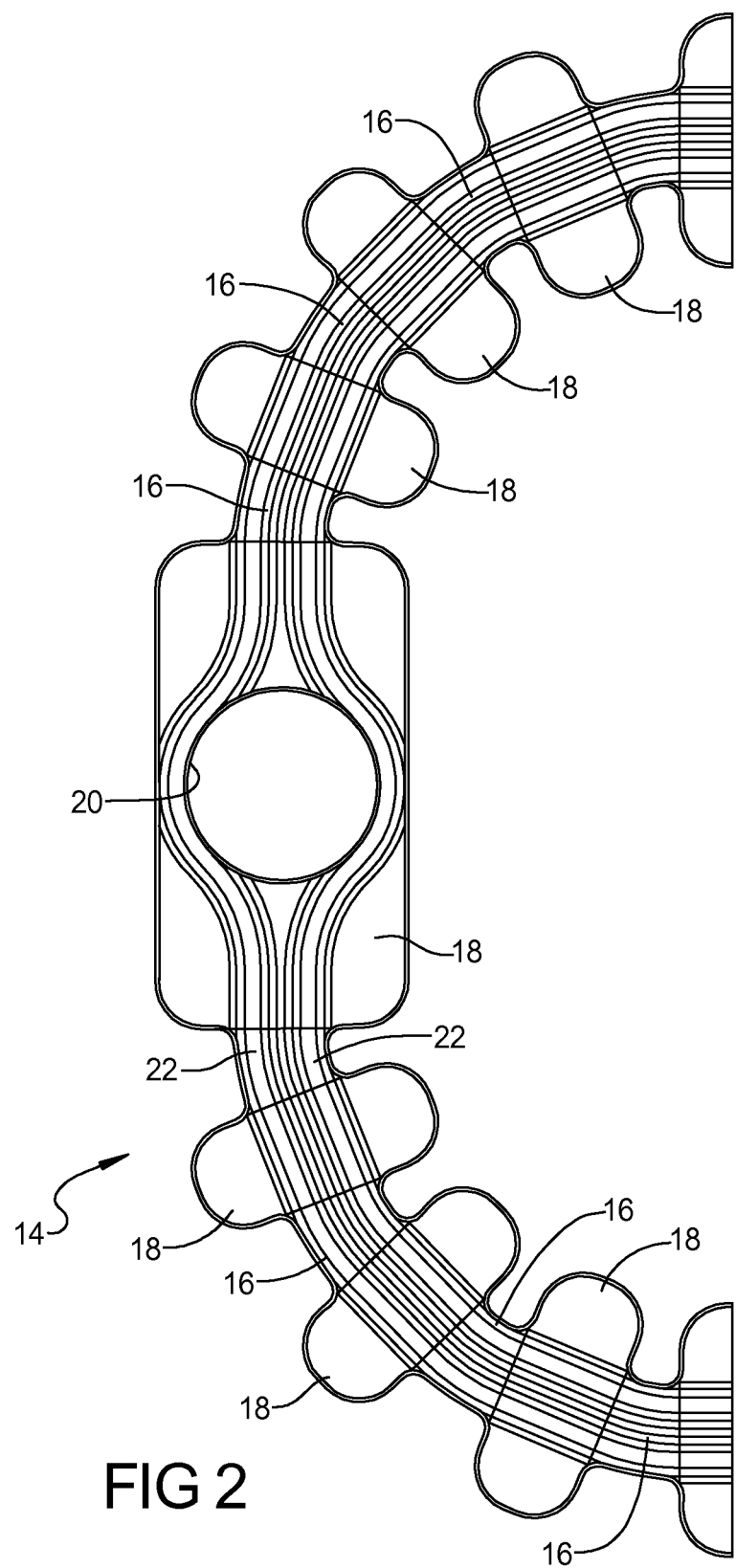
FIG. 2 is a close up plan view of a deformable portion of the gasket shown in FIG. 1.

With reference to FIGS. 1 and 2, a gasket 10 is shown wherein the gasket is molded in a deformed shape and is then straightened out into its assembled configuration 10' when assembled into a battery or other large component requiring a gasket-type seal. The gasket 10 includes a plurality of corner sections 12. The corner sections 12 can have a cross-section as illustrated in FIG. 10. It is noted that the "corner sections" are intended to include directional transition regions that can include 90 degree or other angled transition regions or radiused transition regions. The corner sections each have a width W1 in cross-section that is significantly greater than a height H1 of the corners' cross-section. A plurality of deformable sections 14 are disposed between a pair of the plurality of corner sections 12. The deformable sections 14 can have a cross-section as illustrated in FIG. 11. Each of the deformable sections 14 have a plurality of reduced width segments 16 spaced between a plurality of increased width segments 18, as illustrated in FIG. 2. The increased width segments 18 can have a same or similar cross-section as the corner sections 12, as illustrated in FIG. 10. At least one of the increased width segments 18 can include a bolt hole 20 extending therethrough.

Figure 3:
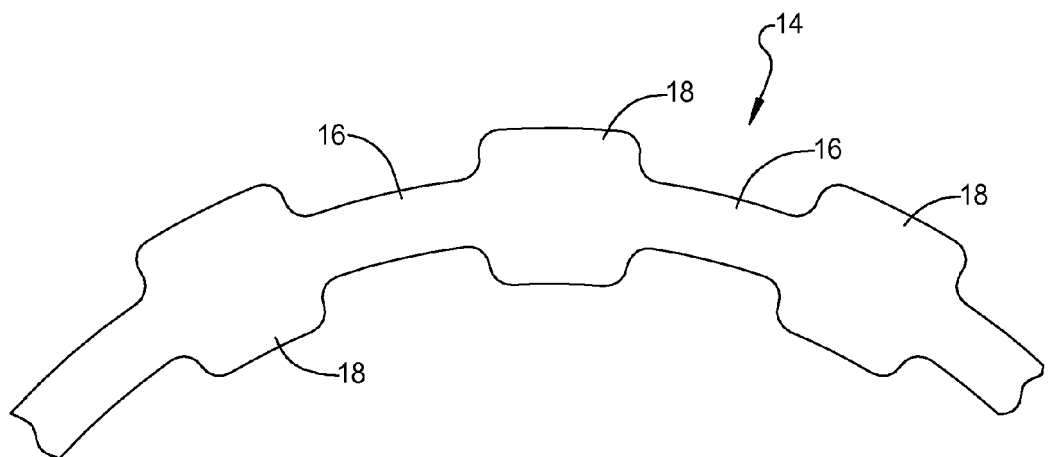
FIG. 3 is a close up plan view of a deformable portion according to a further embodiment.
Figure 4:
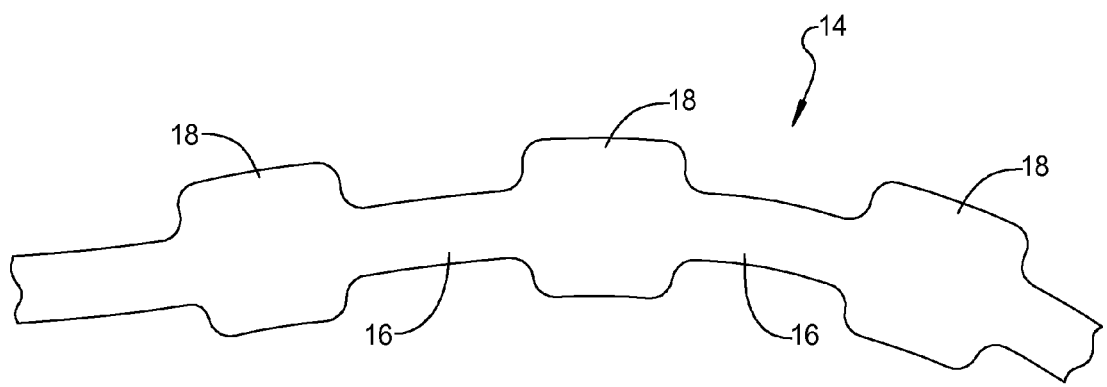
FIG. 4 is a close up plan view of the deformable portion shown in FIG. 3 being straightened out according to the principles of the present disclosure.

Furthermore, the plurality of corner sections 12 and deformable sections 14 can be provided with one or more raised sealing beads 22 that are continuous around the entire perimeter of the gasket 10. The increased width segments 18 can have a cross-section having a width of approximately equal dimension to the width dimension of the plurality of corner sections 12. The plurality of deformable sections 14 are provided with a curved shape such as shown in FIGS. 2 and 3 that is deformable to a straight shape 14' as illustrated in the straightened out gasket 10' in FIG. 1 or, as illustrated in FIG. 4. The deformable sections 14 allow the gasket 10 to be formed with a smaller molding footprint than the assembled gasket shape 10' and the plurality of corner sections 12 have a same angled orientation in its installed and un-installed molded positions. The increased width segments 18 of the deformable section 14 are designed to prevent the straightened out section 14 to resist twisting when straightened.

It should be noted that the corner sections 12 and the increased width segments 18 can have a width dimension W1 which is significantly larger than a width dimension W2 of the reduced width sections 16. By way of non-limiting example, the width W1 of the corner sections 12 can have a width of at least 1.5 times to four times a width W2 of the reduced width sections 16. More preferably, the width W1 can be two to three times the width W2 of the reduced width sections 16. The cross-section of the plurality of corner sections 12 and the cross-section of the plurality of deformable sections 14 have a generally equal height dimension. The plurality of corner sections 12 as well as the plurality of increased width segments 18 of the deformable sections 14 have a width dimension W1 that is significantly greater than the height dimension H1 thereof. The size and shape of the increased width segments 18 and the reduced width segments 16 of the deformable sections 14 can be varied as illustrated between FIGS. 2 and 3. The straightening out of the deformable sections 14 involves straightening of the plurality of reduced width segment 16 while the increased width segments 18 of the plurality of deformable sections 14 remain generally undeformed.

The gasket 10 can be formed with a plurality of indexing posts 24 as illustrated in FIG. 12. The indexing posts 24 can be inserted in corresponding bores in the body being sealed in order to hold the gasket in place during the assembly process. The indexing posts 24 can be beveled or oversized so as to provide an interference fit when being inserted in bores in the mating component. The indexing posts 24 can be located between the beads 22, as shown in FIG. 12, or can be outside of the beads 22. The use of the posts 24 are optional and may not be necessary in all applications. As an optional alternative as shown in FIGS. 13 and 14, the corner sections 12 and/or the increased width segments 18 can have a U-shaped cross-section. The U-shape allows assembly of the gasket to a matched shape mating components wherein sidewalls 26 of the U-shaped cross-section straddle the edges of the mating components to help secure the gasket in place during assembly. As shown in FIG. 14, the sidewalls 26' can include undercut portions 28 for engaging corresponding recesses in the mating component and to further enhance the retaining function of the sidewalls 26'. The use of the U-shaped cross-section of FIGS. 13 and 14 or the indexing posts 24 in the corner sections 12 and/or sections 18 does not affect the deformability of the reduced width sections 16 of the deformable section 14, but add significant stability to the gasket during the assembly process.

Figure 5:
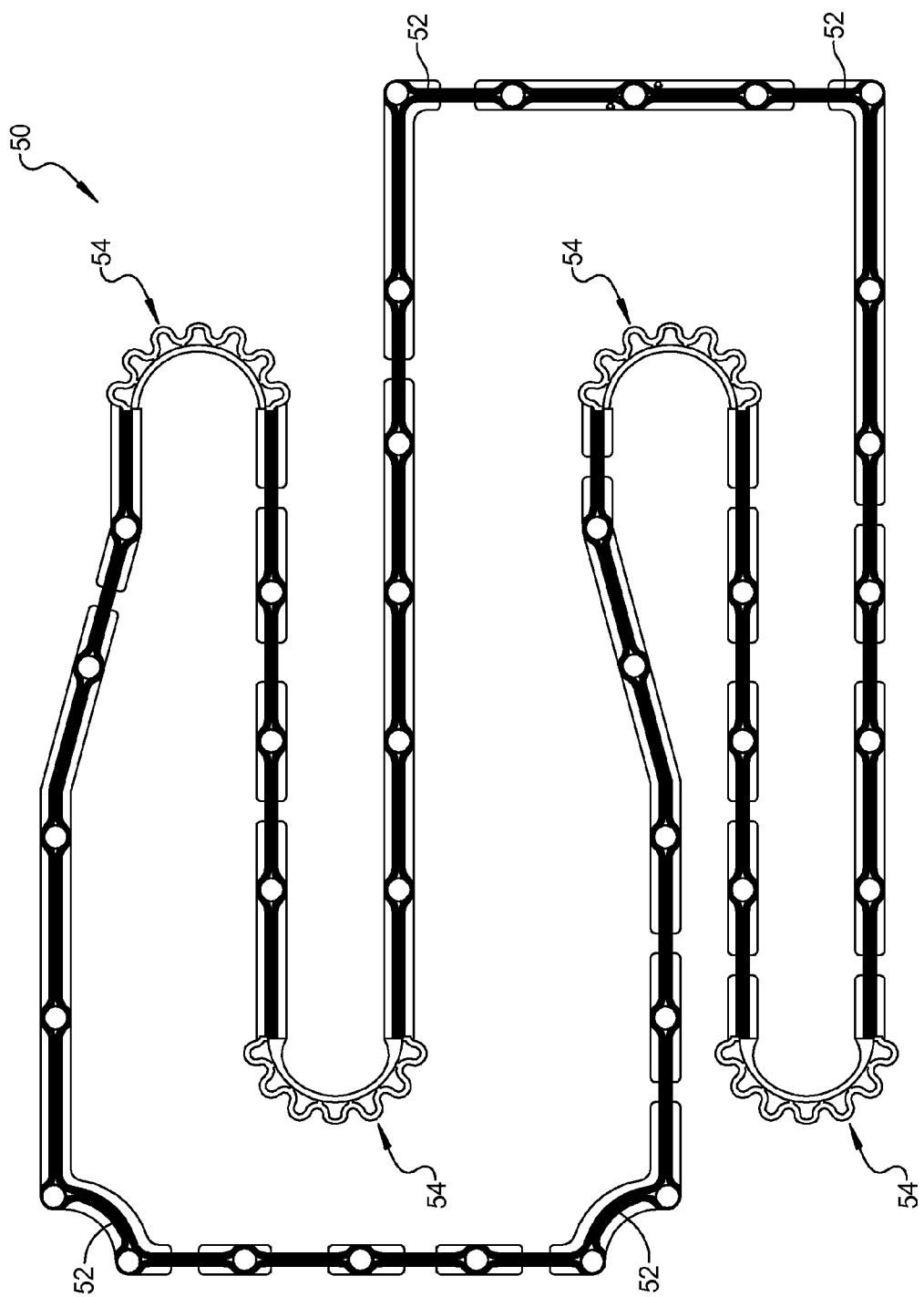
FIG. 5 is a top plan view of a large gasket formed in a deformed shape according to the principles of the present disclosure.
Figure 6:
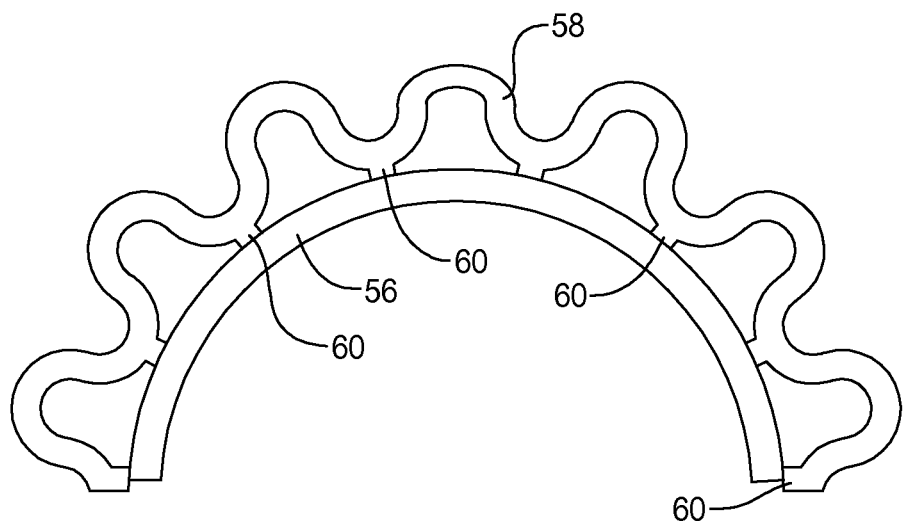
FIG. 6 is a close-up plan view of a deformable portion of the gasket shown in FIG. 5.
Figure 7:
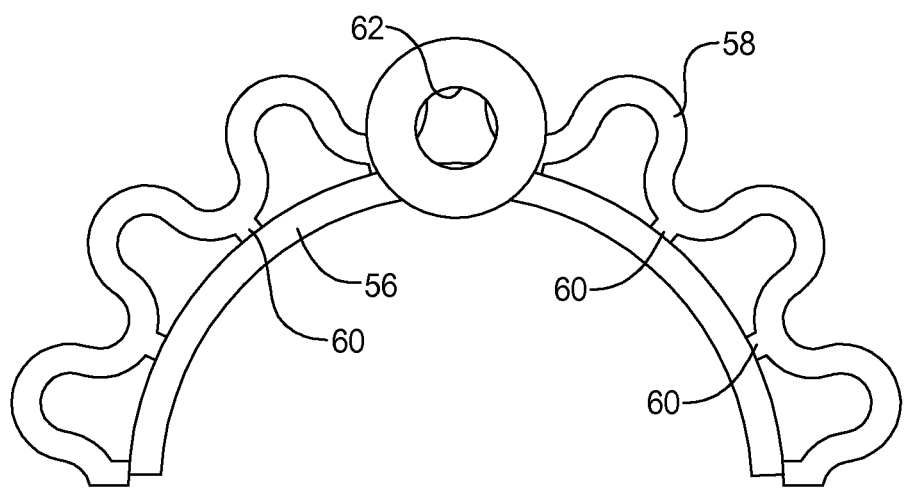
FIG. 7 is a close up plan view of a deformable portion having a bolt hole therein.
Figure 8:
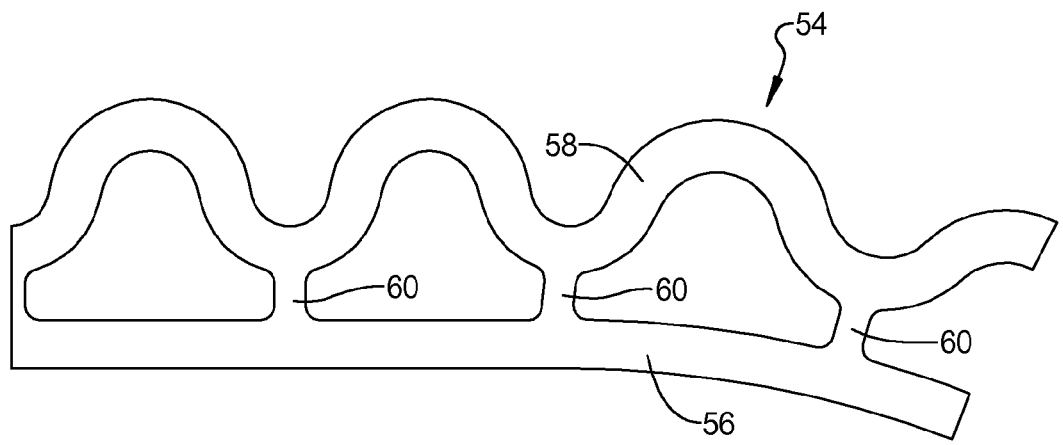
FIG. 8 is a close up plan view of the deformable portion shown in FIG. 6 being straightened out according to the principles of the present disclosure.
Figure 9:
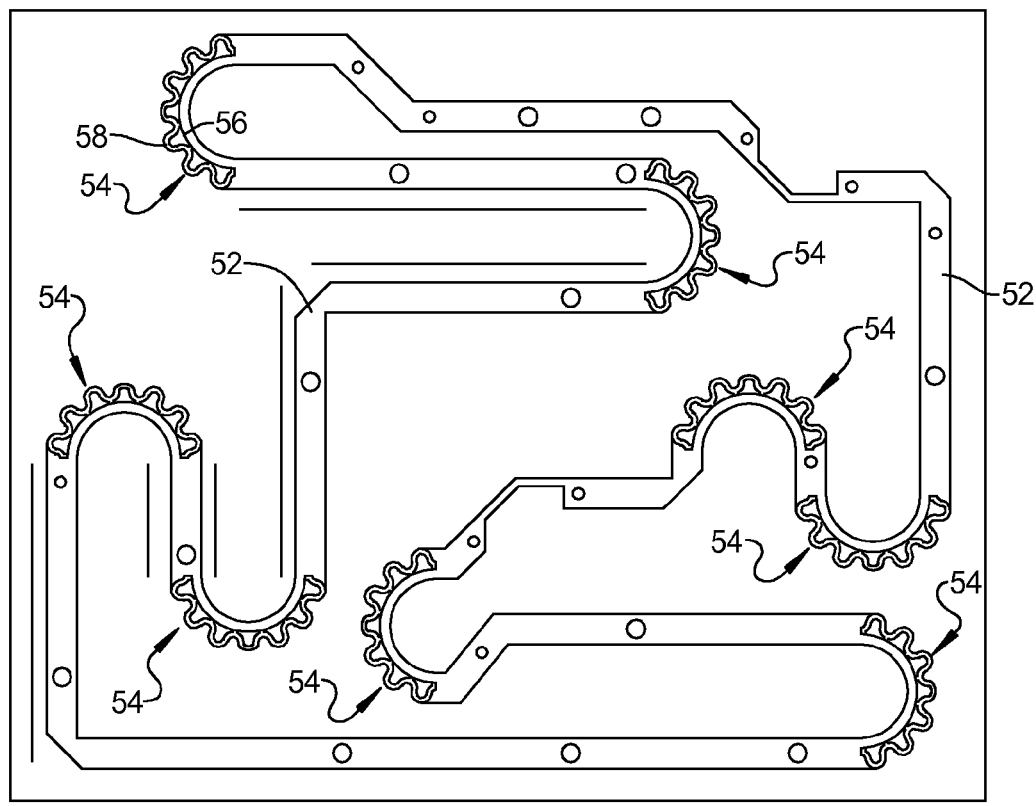
FIG. 9 is a schematic view of a large gasket formed in a deformed shape according to the principles of the present disclosure.

With reference to FIGS. 5-9, a gasket 50 according to an alternative embodiment of the present application will now be described. As shown in FIG. 5, the gasket 50 is shown in a deformed state and includes a plurality of corner sections 52 and a plurality of deformable sections 54. The corner sections 52 each have a width in cross-section that is significantly wider than a height of the corner's cross-section. The plurality of deformable sections 54 are disposed between the plurality of corner sections 52 and each include an arcuate body 56 having an undulating bridge portion 58 attached to the arcuate body 56 at a plurality of spaced locations 60. The curved shape of the deformable sections 54 are deformable to a straight shape such as is illustrated in FIG. 8 in its installed condition. The deformable sections 54 allow the gasket 50 to be formed with a smaller molding footprint, as shown, than the assembled gasket shape in the same manner as the embodiment of FIG. 1. The plurality of corner sections 52 also have a same angled orientation in their installed and un-installed position in the same manner as the embodiment of FIG. 1. It is noted that the deformable sections 54 can be provided with a bolt hole 62, as illustrated in FIG. 7. Furthermore, the height of the arcuate body 56 and undulating bridge portion 58 can be equal to a height of the corner sections 52. Furthermore, the corner sections 52 can be provided with raised bead sections 52 that are continuous along the arcuate body 56 and undulating bridge portions 58 so as to provide continuous sealing beads around the entire perimeter of the gasket 50. In the embodiment illustrated in FIG. 9, at least one deformable section 54 is provided between each adjacent pair of corner sections 52 so that a large square or generally square gasket can be formed with a smaller molding footprint than the assembled gasket shape.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A gasket comprising:
a plurality of corner sections; and
a plurality of deformable sections disposed between a pair of said plurality of corner sections, and including an arcuate body in a plan view having a plurality of undulating bridge portions attached to said arcuate body at a plurality of spaced locations, said plurality of deformable sections each having a curved shape that is deformable to a straight shape in its installed condition, wherein said deformable sections allow said gasket to be formed with a smaller molding footprint than the assembled gasket shape and said plurality of corner sections have a same angled orientation in its installed and un-installed positions.

2. The gasket according to claim 1, wherein said arcuate body has a cross-section having a width of less than one-third of a width of a cross-section of said plurality of corner sections.

3. The gasket according to claim 1, wherein said plurality of deformable sections have a cross-section taken through said bridge portion and said arcuate body that is approximately equal to a width of a cross-section of said plurality of corner sections.

4. The gasket according to claim 1, further comprising at least one bolt hole and bolt sealing portion disposed in at least one of said plurality of deformable sections.

5. The gasket according to claim 1, wherein a cross-section of said plurality of corner sections has a greater width dimension than a height dimension.

6. A gasket comprising:
a plurality of corner sections each having a cross-section having a width of at least a first dimension;
a plurality of deformable sections disposed between a pair of said plurality of corner sections, each of said plurality of deformable sections having a plurality of reduced width segments spaced between a plurality of increased width segments, said increased width segments having a cross-section having a width of at least said first dimension and said plurality of reduced width segments having a cross-section having a width less than said first dimension, said plurality of deformable sections having a curved shaped in a plan view that is deformable to a straight shape in its installed condition, wherein said deformable sections allow said gasket to be formed with a smaller molding footprint than the assembled gasket shape and said plurality of corner sections have a same angled orientation in its installed and un-installed molded positions; and
at least one bolt hole disposed in at least one of said plurality of deformable sections.

7. The gasket according to claim 6, wherein said cross-section of said plurality of corner sections and a cross-section of said plurality of deformable sections have a generally equal height dimension.

8. The gasket according to claim 6, wherein said plurality of corner sections and said plurality of deformable sections include a continuous sealing bead extending along a surface thereof.

9. The gasket according to claim 6, further comprising the at least one bolt hole having a bolt sealing portion disposed in at least one of said plurality of deformable sections.

10. The gasket according to claim 6, wherein a cross-section of said plurality of corner sections has a greater width dimension than a height dimension.

11. The gasket according to claim 6, wherein at least one of said plurality of corner sections includes a U-shaped cross-section.

12. The gasket according to claim 11, wherein said U-shaped cross-section includes at least one undercut portion in at least one of a pair of sidewalls of said U-shaped cross-section.

13. The gasket according to claim 6, wherein at least one of said increased width segments includes a U-shaped cross-section.

14. The gasket according to claim 13, wherein said U-shaped cross-section includes at least one undercut portion in at least one of a pair of sidewalls of said U-shaped cross-section.

* * * * *